US012793534B2

(12) United States Patent
Wolf et al.

(10) Patent No.: US 12,793,534 B2
(45) Date of Patent: Nov. 10, 2026

(54) MULTI-GAS FIRE SENSING DEVICE TESTING

(71) Applicant: Honeywell International Inc., Charlotte, NC (US)

(72) Inventors: Benjamin Henry Wolf, Leicester (GB); Scott Robert Lang, Geneva, IL (US); Michael Barson, Nuneaton (GB)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/976,627

(22) Filed: Dec. 11, 2024

(65) Prior Publication Data

US 2026/0162518 A1 Jun. 11, 2026

(51) Int. Cl.
*G08B 29/04* (2006.01)
*G08B 17/10* (2006.01)

(52) U.S. Cl.
CPC ........... *G08B 29/043* (2013.01); *G08B 17/10* (2013.01)

(58) Field of Classification Search
None
See application file for complete search history.

(56) References Cited

U.S. PATENT DOCUMENTS 4,249,169 A * 2/1981 Malinowski ......... G08B 17/107 340/630
4,901,056 A * 2/1990 Bellavia ............... G08B 29/145 340/630
5,064,271 A * 11/1991 Kern ...................... G08B 17/12 385/33
5,552,763 A 9/1996 Kirby
7,142,105 B2 11/2006 Chen
10,890,910 B1 * 1/2021 Bart ..................... G05D 1/0088
11,024,154 B1 * 6/2021 Lang ...................... G08B 29/24
11,227,473 B1 * 1/2022 Griffith ................ G08B 17/107
11,604,248 B1 * 3/2023 Onofrio ............. G08B 13/1672
11,676,466 B2 * 6/2023 Dearden .............. G08B 17/107 340/511
2003/0037590 A1 2/2003 Stark
2004/0035179 A1 2/2004 Koch
(Continued)

FOREIGN PATENT DOCUMENTS

DE 102012215212 A1 3/2014
EP 1281957 A1 2/2003
(Continued)

OTHER PUBLICATIONS

Dale Litwhiler, et al., Testing of Carbon Monoxide and Carbon Dioxide Sensors with Simple Apparatus in an Engineering Education Laboratory, article, https://peer.asee.org/testing-of-carbon-monoxide-and-carbon-dioxide-sensors-with-simple-apparatus-in-an-engineering-education-laboratory, Jun. 14, 2009, 16 pages.

*Primary Examiner* — Muhammad Adnan
(74) *Attorney, Agent, or Firm* — Brooks, Cameron & Huebsch, PLLC

(57) ABSTRACT

Devices, methods, and systems for performing multi-gas fire sensing device testing are described herein. One fire sensing device includes a self-test module and a controller configured to change a temperature within the self-test module, generate test media in response to the change in temperature; and detect a number of gases corresponding to the test media within the fire sensing device in response to changing the temperature within the self-test module.

20 Claims, 5 Drawing Sheets

(56) References Cited

U.S. PATENT DOCUMENTS

2004/0100375 A1* 5/2004 Tanguay ................ G08B 25/00
340/524
2006/0192680 A1* 8/2006 Scuka .................. G08B 29/043
340/506
2013/0119281 A1* 5/2013 Lang .................... G08B 29/183
250/564
2015/0187194 A1* 7/2015 Hypolite ................ G08B 17/10
340/628
2020/0191716 A1* 6/2020 Tanaka ................... G01N 21/61
2020/0250963 A1* 8/2020 Rodriguez ........... G08B 29/145
2021/0065536 A1* 3/2021 Dearden .............. G08B 17/103
2021/0248901 A1* 8/2021 Lang ...................... G08B 17/10
2022/0139185 A1* 5/2022 Griffith ................ G08B 29/145
340/516
2023/0162593 A1* 5/2023 Lang ...................... G08B 29/24
340/628
2023/0343204 A1* 10/2023 Ganesan ................ G08B 17/06
2023/0349874 A1 11/2023 Briscoe et al.
2024/0159410 A1* 5/2024 Ganesan .................. F24F 11/33
2024/0404383 A1* 12/2024 Wolf .................... G08B 17/107
2025/0201107 A1* 6/2025 Wolf .................... G08B 29/145
2026/0162518 A1* 6/2026 Wolf .................... G08B 29/043

FOREIGN PATENT DOCUMENTS

EP 3792890 A1 3/2021
EP 4443405 A1 10/2024

* cited by examiner

MULTI-GAS FIRE SENSING DEVICE TESTING

TECHNICAL FIELD

The present disclosure relates generally to devices, methods, and systems for multi-gas fire sensing device testing.

BACKGROUND

Large facilities (e.g., buildings), such as commercial facilities, office buildings, hospitals, and the like, may have a fire alarm system that can be triggered during an emergency situation (e.g., a fire) to warn occupants to evacuate. For example, a fire alarm system may include a fire control panel and a plurality of fire sensing devices (e.g., smoke detectors), located throughout the facility (e.g., on different floors and/or in different rooms of the facility) that can sense a fire occurring in the facility and provide a notification of the fire to the occupants of the facility via alarms.

Maintaining the fire alarm system can include regular maintenance and/or testing of fire sensing devices. Such maintenance and/or testing of fire sensing devices may be mandated by codes of practice in an attempt to ensure that the fire sensing devices are functioning properly.

DETAILED DESCRIPTION

Figure 1:
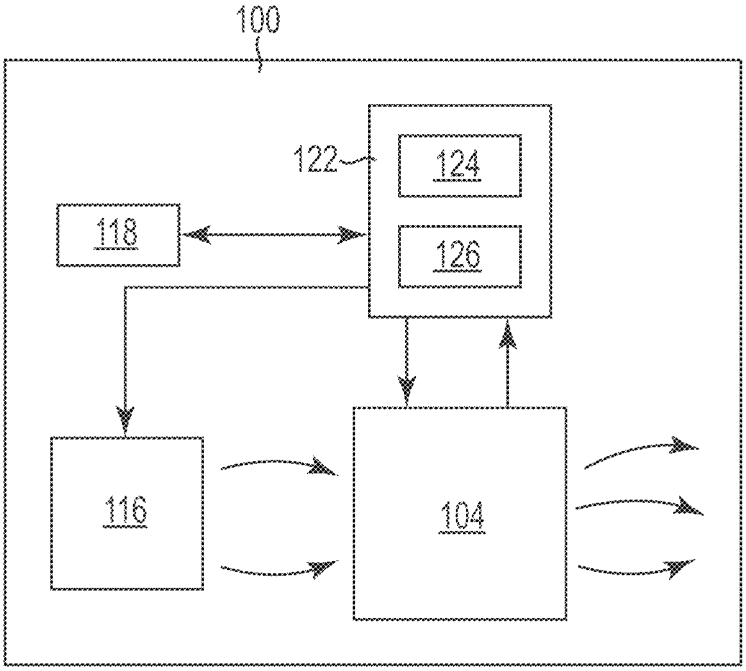
FIG. 1 illustrates a block diagram of a multi-gas fire sensing device in accordance with one or more embodiments of the present disclosure.

Devices, methods, and systems for performing multi-gas fire sensing device testing are described herein. One device includes a self-test module and a controller configured to change a temperature within the self-test module, generate test media in response to the change in temperature; and detect a number of gases corresponding to the test media within the fire sensing device in response to changing the temperature within the self-test module. As mentioned above, maintaining a fire alarm system can include regular cleaning and/or testing of the fire sensing devices of the fire alarm system. However, since tests may only be completed periodically, there is a risk that faulty fire sensing devices may not be discovered quickly or that tests will not be carried out on all the fire sensing devices in a fire alarm system.

Further, testing each individual fire sensing device can be time consuming, expensive, and disruptive to a business. For example, a maintenance engineer is often required to access fire sensing devices which are situated in areas occupied by building users or areas of buildings that are often difficult to access (e.g., elevator shafts, high ceilings, ceiling voids, etc.). As such, the maintenance engineer may take several days and several visits to complete testing of the fires sensing devices, particularly at a large site. Additionally, it is often the case that many fire sensing devices never get tested because of access issues.

A typical test includes a maintenance engineer using pressurized aerosol to force synthetic smoke into a chamber of a fire sensing device, which can saturate the chamber. In some examples, the maintenance engineer can also use a heat gun to raise the temperature of a heat sensor in a fire sensing device and/or a gas generator to expel carbon monoxide (CO) gas into a fire sensing device. These tests may not accurately mimic the characteristics of a fire and as such, the tests may not accurately determine the ability of a fire sensing device to detect an actual fire.

Over time a fire sensing device can become dirty with dust and debris, for example, and become clogged. A clogged fire sensing device can prevent gas and/or particles from passing through the fire sensing device to sensors in the fire sensing device, which can prevent a fire sensing device from detecting smoke, fire, and/or carbon monoxide.

In order to ensure fire sensing devices are thoroughly and accurately tested in a quick, easy, and inexpensive manner, fire sensing devices in accordance with the present disclosure can utilize a self-test procedure. The self-test procedure can be an automatic procedure performed by a fire sensing device without a user, such as a maintenance engineer or other type of user, needing to be present at the fire sensing device. The self-test procedure can therefore allow fire sensing devices to be tested, even if such fire sensing devices are remotely located and/or difficult to access.

The self-test procedure can include changing the temperature within a fire sensing device to illicit a physical change of a test medium. The test medium can be included within a self-test module included in the fire sensing device. The change in temperature can cause a chemical change within the test medium. For example, the test medium may be a wax compound that when exposed to a change in temperature, stimulates multiple gas reactions. The test medium may include multiple wax compounds that, when exposed to various temperatures, generate a range of gas reactions.

The fire sensing device can also include an automated process of detecting background gases in an ambient environment to determine functionality by increasing the sensitivity of the multi-gas fire sensing device periodically. The sensitivity of the fire sensing device can be increased to detect gas levels in the local environment of the fire sensing device. Variance in the level of gases detected during the heightened sensitivity period can be used to determine whether the fire sensing device is functioning correctly.

Performing multi-gas fire sensing device testing, according to the present disclosure, can allow for the detection of multiple gases by the sensing device (e.g., a multi-gas detector of the sensing device) according to an automated self-test procedure. The test medium within the self-test module can be periodically adjusted to various temperatures and the multi-gas detector can detect a number of gases generated at the varying temperatures. Such automation of multi-gas testing can provide for a more diverse and reliable self-test procedure, even in varying environmental conditions (e.g., external airflow changes, ambient temperature changes, etc.), as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 illustrates a block diagram of a fire sensing device 100 in accordance with one or more embodiments of the present disclosure. The fire sensing device 100 can include a controller (e.g., microcontroller) 122, a sounder 118, an optical scatter chamber 104, and an air movement device 116.

The controller 122 can include a memory 124 and a processor 126. Memory 124 can be any type of storage medium that can be accessed by processor 126 to perform various examples of the present disclosure. For example, memory 124 can be a non-transitory computer readable medium having computer readable instructions (e.g., computer program instructions) stored thereon that are executable by processor 126 to perform a fire sensing device self-test procedure in accordance with the present disclosure. For instance, processor 126 can execute the executable instructions stored in memory 124 to change a temperature within a self-test module of fire sensing device, generate test media in response to the change in temperature, detect a number of gases corresponding to the test media within the fire sensing device after changing the temperature within the self-test module, and transmit a result of the detection to a computing device. As an additional example, processor 126 can execute the executable instructions stored in memory 124 to increase the sensitivity of a multi-gas detector of fire sensing device 100, detect, via the multi-gas detector, a concentration of gases within the fire sensing device while the sensitivity is increased, and transmit the detected concentration to a computing device.

As an example, test media may be generated from a test medium within a self-test module of a fire sensing device such that a composition of the test medium allows for the production of a number of gases responsive to changing the temperature. The number of gases may be different gases. For example, the number of gases can include carbon monoxide, carbon dioxide, hydrogen, or nitrogen oxide. The controller may be configured to change the temperature within the self-test module in response to a self-test mode being initiated for the fire sensing device.

Figure 2:
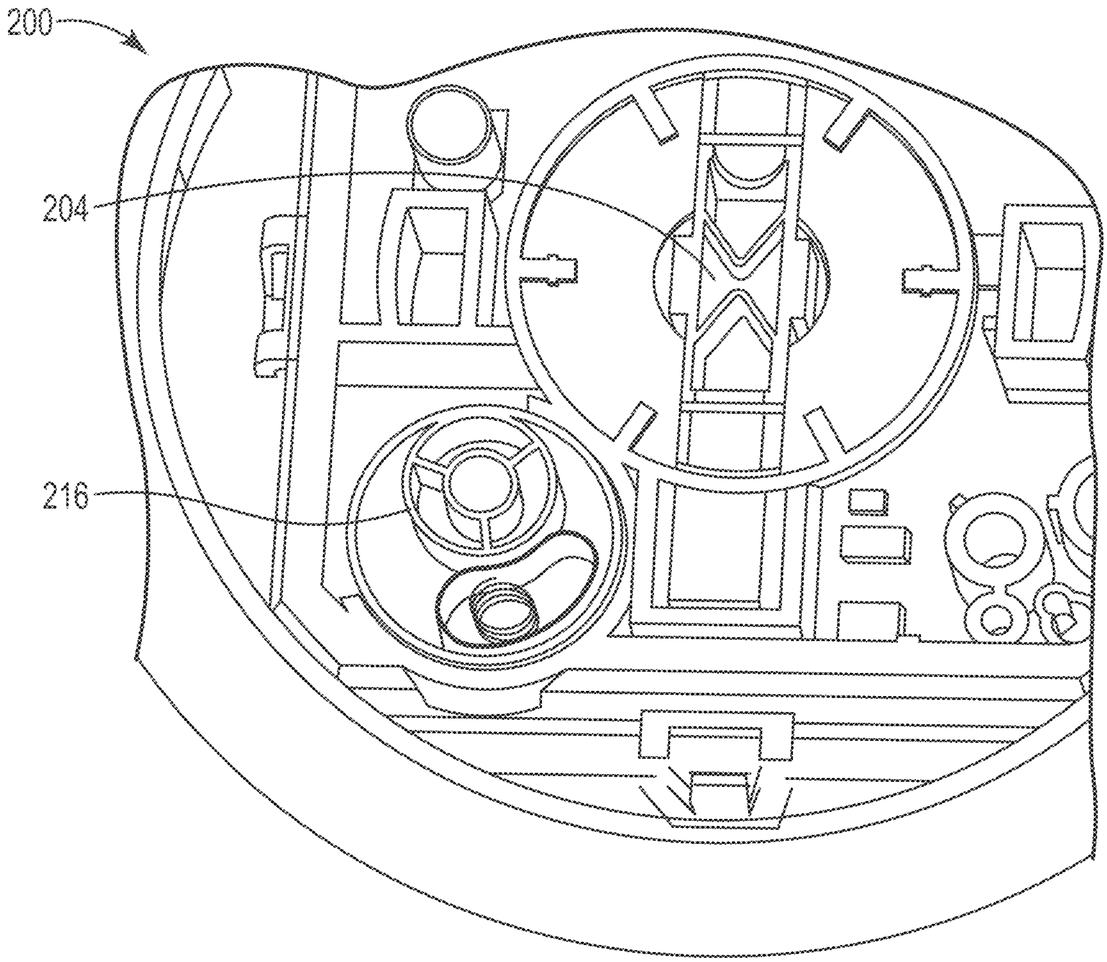
FIG. 2 illustrates a portion of an example of a multi-gas fire sensing device in accordance with one or more embodiments of the present disclosure.

FIG. 2 illustrates a portion of an example of a fire sensing device 200 in accordance with one or more embodiments of the present disclosure. The fire sensing device 200 can correspond to the fire sensing device 100 of FIG. 1 and can be, but is not limited to, a fire and/or smoke detector of a fire control system.

A fire sensing device 200 can sense a fire occurring in a facility and trigger a fire response to provide a notification of the fire to occupants of the facility. A fire response can include visual and/or audio alarms, for example. A fire response can also notify emergency services (e.g., fire departments, police departments, etc.) In some examples, a plurality of fire sensing devices can be located throughout a facility (e.g., on different floors and/or in different rooms of the facility).

As shown in FIG. 2, fire sensing device 200 can include an optical scatter chamber 204 and an air movement device 216, which can correspond to the optical scatter chamber 104 and the air movement device 116 of FIG. 1, respectively. Although an air movement device 216 is illustrated in FIG. 2, any device capable of moving an air sample into the optical scatter chamber 204 can be used. For example, a variable airflow generator or a shaker device could be used instead of and/or in combination with air movement device 216. The air movement device 216 can move ambient air from an environment in which the fire sensing device 200 is located through the fire sensing device into the optical scatter chamber 204 to detect the presence of smoke or other particles in the ambient environment.

The air movement device 216 can control the airflow through the fire sensing device 200, including the optical scatter chamber 204. For example, the air movement device 216 can move particles, gases, and/or aerosol from a first end of the fire sensing device 200 to a second end of the fire sensing device 200. The air movement device 216 can start responsive to a command and can stop responsive to a command and/or after a particular period of time, as is further described herein.

The fire sensing device 200 may be configured to perform a self-test by increasing the sensitivity of a multi-gas detector of fire sensing device 200 at periodic time intervals, for example.

A fire sensing device 200 can automatically or upon command perform a self-test procedure. The self-test procedure can include increasing a sensitivity of a multi-gas detector of fire sensing device 200, detecting, via the multi-gas detector, a concentration of gases within the fire sensing device while the sensitivity of the multi-gas detector is increased, and transmitting the detected concentration to a computing device. The computing device may be a remote computing device. The computing device can determine whether the self-test was successful based on the detected concentration of gases determined to be present within the fire sensing device and additional gases determined not to be present within the fire sensing device while the sensitivity of the multi-gas detector is increased.

The fire sensing device 200 can perform the self-test by, for example, increasing the sensitivity of the multi-gas detector above a threshold and detecting, via the multi-gas detector, a concentration of gases within the fire sensing device while the sensitivity of the multi-gas detector is increased above the threshold. The detected concentration can be transmitted to a computing device. The computing device can determine whether the self-test was successful by comparing the detected concentration level of the gases to a baseline measurement of the gases and determining whether the detected level is different than the baseline measurement.

Further, the computing device can determine whether the self-test was successful by comparing the detected concentration of gases determined to be present within the fire sensing device to gases expected to be present within the fire sensing device at a particular time. For example, it may be determined the self-test failed when the detected concentration of gases determined to be present within the fire sensing device does not match a concentration and/or presence of gases expected to be present within the fire sensing device at a particular time.

The gas concentration detection can include measuring a value associated with an air sample in the optical scatter chamber 204 of the fire sensing device 200. The computing device can further compare the measured value associated with the concentration of gases to a baseline measurement of the gases to determine whether the self-test was successful. The gases can include different types of gases. The gases can have different baseline measurements associated with each particular gas detected. For example, a first gas detected among the number of gases may have a first baseline measurement associated with it and a second gas detected among the number of gases may have a second associated baseline measurement. The number of gases is not limited to a particular number of gases and more than two may be detected.

The computing device may determine whether the self-test was successful by comparing a concentration of each gas among the number of gases to their respective baseline measurement. For example, the computing device may determine the self-test was successful when the concentration of gases detected within the fire sensing device while the sensitivity of the multi-gas detector is increased is different from the baseline measurements associated with the gases. The computing device may determine the self-test was not successful when the concentration of gases detected within the fire sensing device while the sensitivity of the multi-gas detector is increased is the same as the baseline measurements associated with the number of gases. Alternatively, the computing device may determine the self-test was not successful when a portion of the number of gases are the same as their baseline measurements while the sensitivity of the multi-gas detector is increased. As another example, a single baseline measurement may be taken that includes baseline values for each gas detected among the number of gases such that an individual baseline value associated with a particular gas among the number of gases is compared to the detected concentration of each of the number of gases.

The self-test of the fire sensing device may be performed as a background test outside of a normal operation of the fire sensing device. For example, the self-test may be initiated automatically in response to the fire sensing device performing a background test. Alternatively, the self-test may be initiated in response to the fire sensing device receiving a command from the computing device.

The baseline measurements may be stored in a memory of the computing device. The computing device may be a remote computing device.

As shown in FIG. 2, fire sensing device 200 can include an optical scatter chamber 204 and a variable airflow generator 216, which can correspond to the optical scatter chamber 104 and the variable airflow generator 116 of FIG. 1, respectively. Further fire sensing device 200 can also include a controller and an adjustable particle generator analogous to those of FIG. 1. Further, the functionality of optical scatter chamber 204 and variable airflow generator 216 can be analogous to that further described herein for chamber 304 and variable airflow generator 316 in connection with FIG. 3.

Figure 3:
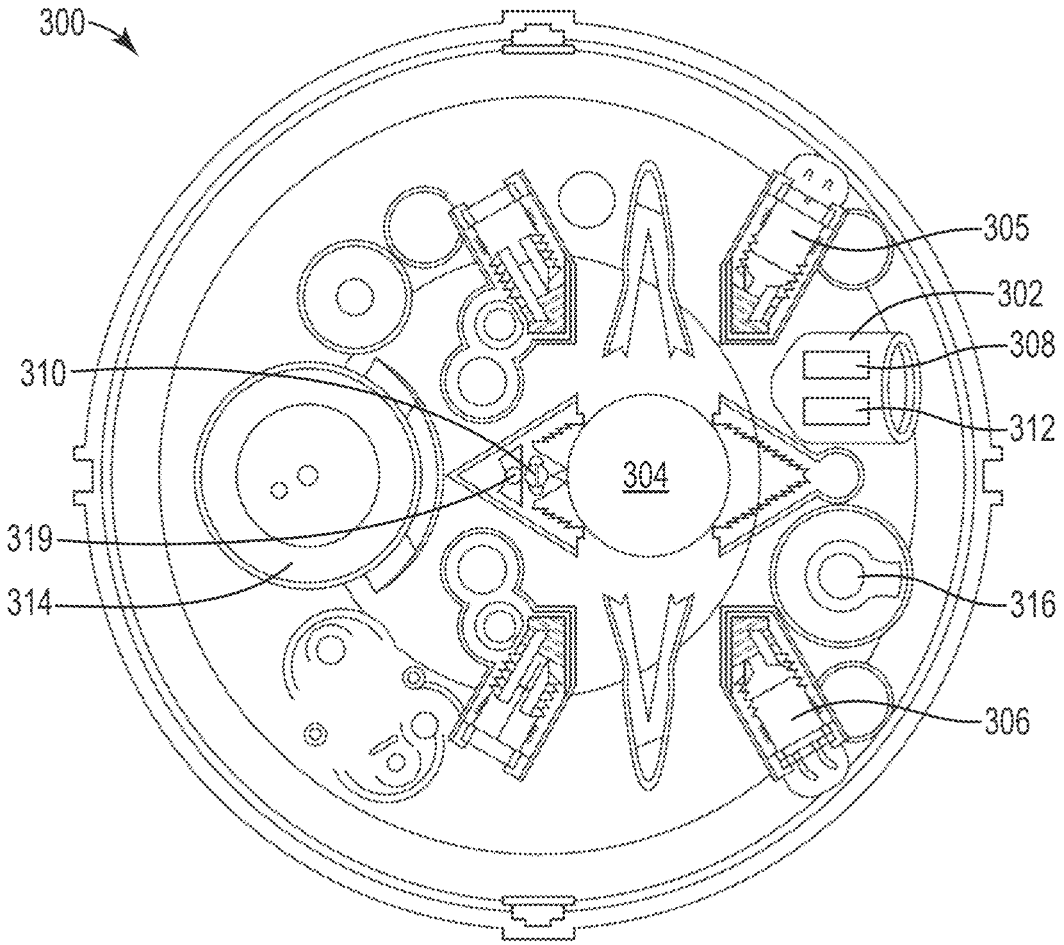
FIG. 3 illustrates an example of a multi-gas fire sensing device in accordance with one or more embodiments of the present disclosure.

FIG. 3 illustrates an example of a multi-gas fire sensing device in accordance with one or more embodiments of the present disclosure. The fire sensing device 300 can correspond to fire sensing device 100 of FIG. 1 and can be, but is not limited to, a fire and/or smoke detector of a fire control system.

A fire sensing device 300 can sense a fire occurring in a facility and trigger a fire response to provide a notification of the fire to occupants of the facility. In some examples, a plurality of fire sensing devices can be located throughout a facility (e.g., on different floors and/or in different rooms of the facility).

A fire sensing device 300 can automatically or upon command conduct one or more tests contained within the fire sensing device 300. The one or more tests can determine whether the fire sensing device 300 is functioning properly and/or requires maintenance.

As shown in FIG. 3, fire sensing device 300 can include an adjustable particle generator 302, an optical scatter chamber 304 including a transmitter light-emitting diode (LED) 305 and a receiver photodiode 306, a heat source 308, a heat sensor 310, a gas source 312, a gas sensor 314, a variable airflow generator 316, and an additional heat source 319. In some examples, a fire sensing device 300 can also include a microcontroller including memory and/or a processor, as previously described in connection with FIG. 1.

The adjustable particle generator 302 of the fire sensing device 300 can generate particles which can be mixed into a controlled aerosol density level by the variable airflow generator 316. The aerosol density level can be a particular level that can be detected by an optical scatter chamber 304. Once the aerosol density level has reached the particular level, the adjustable particle generator 316 can be turned off and the variable airflow generator 316 can increase the rate of airflow through the optical scatter chamber 304. The variable airflow generator 316 can increase the rate of airflow through the optical scatter chamber 304 to reduce the aerosol density level back to an initial level of the optical scatter chamber 304 prior to the adjustable particle generator 316 generating particles. For example, the variable airflow generator 316 can remove the aerosol from the optical scatter chamber 304 after the rate in reduction of aerosol density is determined. If the fire sensing device 300 is not blocked or covered, then airflow from the external environment through the optical scatter chamber 304 will cause the aerosol density level to decrease. The rate at which the aerosol density level decreases indicates whether the sensing device 300 is impeded and whether the sensing device 300 could require maintenance.

The adjustable particle generator 302 can include a reservoir to contain a liquid and/or wax used to create particles. The adjustable particle generator 302 can also include a heat source, which can be heat source 308 or a different heat source. The heat source 308 can be a coil of resistance wire. A current flowing through the wire can be used to control the temperature of the heat source 308 and further control the number of particles generated by the adjustable particle generator 302. The heat source 308 can heat the liquid and/or wax to create airborne particles to simulate smoke from a fire. The particles can measure approximately 1 micrometer in diameter and/or the particles can be within the sensitivity range of the optical scatter chamber 304. The heat source 308 can heat the liquid and/or wax to a particular temperature and/or heat the liquid and/or wax for a particular period of time to generate an aerosol density level sufficient to trigger a fire response from a properly functioning fire sensing device without saturating the optical scatter chamber 304 and/or generate an aerosol density level sufficient to test a fault condition without triggering a fire response or saturating the optical scatter chamber 304. The ability to control the aerosol density level can allow a smoke test to more accurately mimic the characteristics of a fire and prevent the optical scatter chamber 304 from becoming saturated.

The liquid and/or wax may be comprised of a number of compounds to illicit multiple gas reactions. The liquid and/or wax may also be referred to as a test medium and may be included within a self-test module of the fire sensing device 300. The test medium may be comprised of multiple wax compounds such that, when heated to various temperatures, an aerosol is generated to simulate smoke particles that occur during a fire event. For example, the test medium may comprise wax compounds that, when heated to various temperatures, generate carbon monoxide, carbon dioxide, hydrogen, and/or nitrogen oxide.

A temperature within the self-test module may be changed (e.g., increased or decreased) by a controller of the fire sensing device 300. Test media may be generated in response to the change in temperature. For example, test media may be generated from a test medium included within the self-test module in response to the change in temperature within the self-test module. A number of gases corresponding to the test media may be detected within the fire sensing device 300.

For example, a temperature within the self-test module may be increased from a first temperature to a second temperature by a controller of the fire sensing device 300. A first gas (e.g., the presence of a first gas) may be detected within the self-test module in response to increasing the temperature from the first temperature to the second temperature (e.g., the second temperature can correspond to the generation of the first gas). The first gas may be carbon monoxide, carbon dioxide, hydrogen, or nitrogen oxide, for example. The controller of the fire sensing device 300 may then increase the temperature within the self-test module from the second temperature to a third temperature. A second gas (e.g., the presence of a second gas) may be detected in response to increasing the temperature from the second temperature to the third temperature (e.g., the third temperature can correspond to the generation of the second gas). The second gas may be carbon dioxide, hydrogen or nitrogen oxide, and may be different than the first gas. A result of the detections of the first gas and the second gas may be transmitted by the controller of the fire sensing device 300 to a remote computing device. The result may also include an indication of whether the self-test passed or failed based on the detections. The remote computing device may determine whether the fire sensing device is in need of maintenance based on the result of the detections.

For example, a result of the number of gases determined to be present within the fire sensing device may be transmitted to a remote computing device. The remote computing device may determine that the self-test has passed (e.g., the self-test was successful, the results were as expected) by comparing the number of gases determined to be present within the fire sensing device to gases expected to be present within the fire sensing device. For example, it may be determined that the self-test has passed based on a determination that the number of gases determined to be present are the same as the gases expected to be present within the fire sensing device at a particular time. Further, the remote computing device may determine the self-test passed or failed based on additional gases determined not to be present within the fire sensing device. For example, it may be determined that the self-test passed based on a determination that certain gases were not detected to be present within the fire sensing device. It may also be determined that the self-test has failed based on a determination that certain gases expected to be present within the fire sensing device were determined not to be present within the fire sensing device.

The temperature within the self-test module may be increased from the third temperature to a fourth temperature. A third gas (e.g., the presence of a third gas) may be detected within the self-test module after increasing the temperature from the third temperature to the fourth temperature. A fourth gas (e.g., the presence of a fourth gas) may also be detected in response to increasing the temperature from the third temperature to the fourth temperature. For example, two gases may be detected in response to increasing the temperature from one temperature to another temperature. A thermal decomposition of the test medium wax compound may generate two separate gas reactions at the same temperature or in the same range of temperatures. Additional compounds may be added to the test medium wax compound to illicit a greater range of gas responses. Alternatively, or in addition to adding additional compounds to the test medium, a greater range of temperatures may be utilized to illicit a reaction.

The controller of the fire sensing device 300 may be configured to detect a cross-sensitivity to other elements within a number of gases in response to changing the temperature within the self-test module. For example, the controller may detect carbon monoxide generated from the self-test module and cross-sensitivity to other multi-gas elements of the test medium.

As an example, the test medium may be included inside of a testing chamber (e.g., an optical scatter chamber) of the fire sensing device. For example, the controller can cause test media to be generated. In some examples, the test media can include an aerosol. For example, the controller can cause a coil to heat wax until a temperature at which the wax emits an aerosol comprised of smoke particles. The coil and the wax can be included in a self-test module of the fire sensing device, as mentioned above.

While the test medium is described above as being an aerosol, embodiments of the present disclosure are not so limited. For example, the test medium can be, for example, a gas, light, etc.

The controller can initiate the self-test procedure when the fire sensing device 300 is in a test mode (e.g., a self-test mode). For instance, the controller can change the temperature within the self-test module from the first temperature to the second temperature in response to a self-test mode being initiated for fire sensing device 300. When the fire sensing device 300 is in the test mode, particles sensed in the fire sensing device that exceed a threshold amount can be detected, but will not initiate an alarm in the facility.

The controller can cause a sensor in the self-test module of the optical scatter chamber to take a reading for the test media at a predetermined time. The predetermined time can correspond to the temperature within the self-test module reaching a specific temperature. For example, the heat sensor 310 may determine that a target temperature has been reached and the controller may cause a sensor in the self-test module of the optical scatter chamber to take a reading to determine if there are any gases present within the optical scatter chamber 304.

The optical scatter chamber 304 can sense the external environment due to a baffle opening in the fire sensing device 300 that allows air and/or smoke from a fire to flow through the fire sensing device 300. The optical scatter chamber 304 can measure the aerosol density level. In some examples a different measurement device can be used to measure the aerosol density level through the fire sensing device 300. The optical scatter chamber may conduct a reading of the external environment as a baseline measurement. The baseline measurement may be compared to subsequent readings to determine whether a fire event is occurring.

As previously discussed, the rate at which aerosol density level decreases can be used to determine whether fire sensing device 300 requires maintenance. For example, the fire sensing device 300 can be determined to require maintenance responsive to a difference between the measured rate and the baseline rate being greater than a threshold value.

In some examples, the fire sensing device 300 can generate a message if the device requires maintenance (e.g., if the difference between the measured rate and the baseline rate is greater than a threshold value). The fire sensing device 300 can send the message to a remote computing device (e.g., a mobile device), for example. As an additional example, the fire sensing device 300 can include a user interface that can display the message.

The fire sensing device 300 can include an additional heat source 319, but may not require an additional heat source 319 if the heat sensor 310 is self-heated. In some examples, heat source 319 can generate heat at a temperature sufficient to trigger a fire response from a properly functioning heat sensor 310. The heat source 319 can be turned on to generate heat during a heat self-test and/or a multi-gas self-test. Once the heat self-test and/or multi-gas self-test is complete, the heat source 319 can be turned off to stop generating heat.

The heat sensor 310 can normally be used to detect a rise in temperature caused by a fire. Once the heat source 319 is turned off, the heat sensor 310 can measure a rate of reduction in temperature. The rate of reduction in temperature can be used to determine whether the fire sensing device 300 is functioning properly and/or whether the fire sensing device 300 is dirty. The rate of reduction in temperature and can be used to determine whether the fire sensing device 300 requires maintenance. Maintenance can include cleaning the fire sensing device 300 so that clean air is able to enter the fire sensing device 300 and reach the heat sensor 310. The heat sensor 310 can also be used to determine an increase in temperature is sufficient to illicit a reaction during a multi-gas self-test.

A gas source 312 can be separate and/or included in the adjustable particle generator 302, as shown in FIG. 3. The gas source 312 can be configured to release one or more gases. The one or more gases can be generated by combustion. The gas source 312 can be used in conjunction with, or separately from the test medium to perform a multi-gas self-test. In some examples, the one or more gases can be carbon monoxide (CO) and/or a cross-sensitive gas. The gas source 312 can generate gas at a gas level sufficient to trigger a fire response from a properly functioning fire sensing device 300 and/or trigger a fault in a properly functioning gas sensor 314.

The gas sensor 314 can detect one or more gases in the fire sensing device 300, such as, for example, the one or more gases released by the gas source 312. For example, the gas sensor 314 can detect CO and/or cross-sensitive gases. In some examples, the gas sensor 314 can be a CO detector. Once the gas source 312 is turned off, the gas sensor 314 can measure the gas level and determine the change in gas level over time (e.g., rate of reduction in gas level) to determine whether the fire sensing device 300 is functioning properly and/or whether the fire sensing device 300 is dirty.

The rate of reduction in the gas level can be used to determine whether the fire sensing device 300 requires maintenance. Maintenance can include cleaning the fire sensing device 300 so that air is able to enter the fire sensing device 300 and reach the gas sensor 314.

In some examples, the fire sensing device 300 can generate a message if the device requires maintenance (e.g., if the difference between the measured rate and the baseline rate is greater than a threshold value). The fire sensing device 300 can send the message to a remote computing device, for example. As an additional example, the fire sensing device 300 can include a user interface that can display the message.

The variable airflow generator 316 can control the airflow through the fire sensing device 300, including the optical scatter chamber 304. For example, the variable airflow generator 316 can move gases and/or aerosol from a first end of the fire sensing device 300 to a second end of the fire sensing device 300. In some examples, the variable airflow generator 316 can be a fan. The variable airflow generator 316 can start responsive to the adjustable particle generator 302, the heat source 319, and/or the gas source 312 starting. The variable airflow generator 316 can stop responsive to the adjustable particle generator 302, the heat source 319, and/or the gas source 312 stopping, and/or the variable airflow generator 316 can stop after a particular period of time after the adjustable particle generator 302, the heat source 319, and/or the gas source 312 has stopped.

Figure 4:
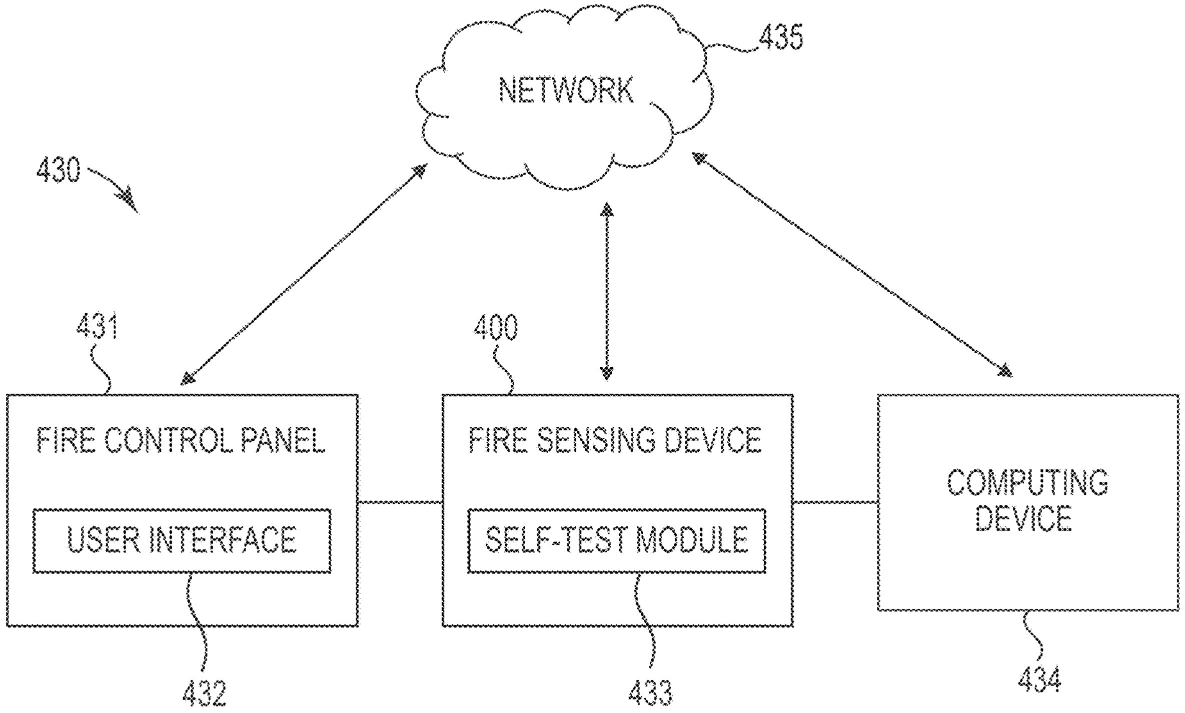
FIG. 4 illustrates an example of a system for multi-gas fire sensing device testing in accordance with one or more embodiments of the present disclosure.

FIG. 4 illustrates an example of a system 430 for multi-gas fire sensing device testing in accordance with one or more embodiments of the present disclosure. The system 430 can be, for instance, a fire alarm system, and can include a fire sensing device 400, a fire control panel 431, and a computing device 434. Fire sensing device 400 can be, for example, fire sensing device 100, 200, and/or 300 previously described in connection with FIGS. 1, 2, and 3, respectively. For example, fire sensing device 400 can include self-test module 433, which can be the self-test module previously described in connection with FIGS. 1 and 3. Computing device 434 can be the remote computing device previously described in connection with FIGS. 2 and 3. The fire sensing device 400, fire control panel 431, and computing device 434 may be connected via network 435.

The fire control panel 431 can be a monitoring device, a fire detection control system, and/or a cloud computing device of the fire alarm system 430. The fire control panel 431 can be configured to send commands to and/or receive reports from a fire sensing device 400 via a wired or wireless network. For example, the fire sensing device 400 can report a sensor reading during a self-test procedure of the fire sensing device 400. Additionally, in some examples the fire sensing device 400 can report a confirmed fire to the fire control panel 431 responsive to a measured value after a particular period of time being greater than a threshold value.

The fire control panel 431 can receive reports from a number of fire sensing devices analogous to fire sensing device 400. For example, the fire control panel 431 can receive reports from each of a number of fire sensing devices analogous to fire sensing device 400 and transmit commands based on the reports from each of the number of fire sensing devices.

In a number of embodiments, the fire control panel 431 can include a user interface 432. The user interface 432 can be a GUI that can provide and/or receive information to and/or from a user and/or the fire sensing device 400. The user interface 432 can display messages and/or data received from the fire sensing device 400. For example, the user interface 432 can alert a user to an unconfirmed fire, a confirmed fire, and/or a false alarm reported by the fire sensing device 400.

The network 435 described herein can be a network relationship through which fire sensing device 400, fire control panel 431, and/or computing device 434 can communicate with each other. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive information from and transmit information to fire sensing device 400, fire control panel 431, and computing device 434 via a wired or wireless network.

As used herein, a "network" can provide a communication system that directly or indirectly links two or more computers and/or peripheral devices and allows a fire control panel to access data and/or resources on a fire sensing device 400 and vice versa. The network 435 can allow users to share resources on their own systems with other network users and to access information on centrally located systems or on systems that are located at remote locations. For example, the network 435 can tie a number of computing devices together to form a distributed control network (e.g., cloud).

The network 435 may provide connections to the Internet and/or to the networks of other entities (e.g., organizations, institutions, etc.). Users may interact with network-enabled software applications to make a network request, such as to get data. Applications may also communicate with network management software, which can interact with network hardware to transmit information between devices on the network 435.

In some examples, the network 435 can be used by the fire sensing device 400 and/or the fire control panel 431 to communicate with computing device 434. The computing device 434 can be a personal laptop computer, a desktop computer, a mobile device such as a smart phone, a tablet, a wrist-worn device, and/or redundant combinations thereof, among other types of computing devices. The computing device 434 can receive reports from a number of fire sensing devices analogous to fire sensing device 400 and/or a number of fire control panels analogous to fire control panel 431 and transmit commands based on the reports to one or more of the number of fire sensing devices and/or one or more of the number of fire control panels.

Figure 5:
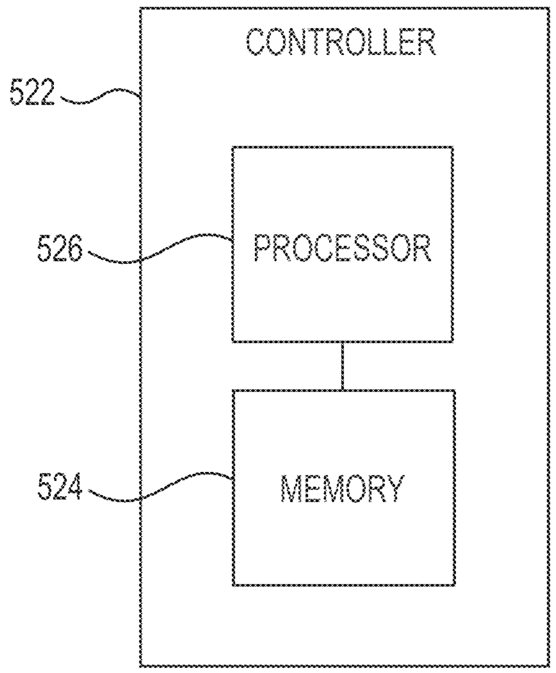
FIG. 5 is an example of a controller for performing multi-gas fire sensing device testing in accordance with one or more embodiments of the present disclosure.

FIG. 5 is an example of a controller 522 for performing multi-gas fire sensing device testing in accordance with one or more embodiments of the present disclosure. Controller 522 can be a controller (e.g., microcontroller) of fire sensing device 100, 200, 300, and/or 400 previously described in connection with FIGS. 1, 2, 3, and 4, respectively. For instance, controller 522 can be controller 122 previously described in connection with FIG. 1. As illustrated in FIG. 5, the controller 522 can include a memory 524 and a processor 526 for performing multi-gas fire sensing device testing in accordance with one or more embodiments of the present disclosure.

The memory 524 can be any type of storage medium that can be accessed by the processor 526 to perform various examples of the present disclosure. For example, the memory 524 can be a non-transitory computer readable medium having computer readable instructions (e.g., executable instructions/computer program instructions) stored thereon that are executable by the processor 526 for performing a self-test procedure in accordance with the present disclosure.

The memory 524 can be volatile or nonvolatile memory. The memory 524 can also be removable (e.g., portable) memory, or non-removable (e.g., internal) memory. For example, the memory 524 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 524 is illustrated as being located within controller 522, embodiments of the present disclosure are not so limited. For example, memory 524 can also be located internal to another computing resource (e.g., enabling computer readable instructions to be downloaded over the Internet or another wired or wireless connection).

The processor 526 may be a central processing unit (CPU), a semiconductor-based microprocessor, and/or other hardware devices suitable for retrieval and execution of machine-readable instructions stored in the memory 524.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A fire sensing device, comprising:

a self-test module; and a controller configured to:

change a temperature within the self-test module;

generate test media from a test medium in response to the change in temperature, wherein the test medium stimulates multiple gas reactions when exposed to the change in temperature; and detect a number of gases corresponding to the test media within the fire sensing device in response to changing the temperature within the self-test module.

2. The fire sensing device of claim 1, wherein the test medium is included within the self-test module.

3. The fire sensing device of claim 1, wherein the number of gases are generated from the test media as the temperature changes within the self-test module.

4. The fire sensing device of claim 1, wherein the controller is configured to detect a cross-sensitivity to other elements within the number of gases in response to the change in the temperature within the self-test module.

5. The fire sensing device of claim 1, wherein the controller is configured to change the temperature within the self-test module in response to a self-test mode being initiated for the fire sensing device.

6. The fire sensing device of claim 1, wherein the number of gases include different gases.

7. A method, comprising:

changing, by a controller of a fire sensing device, a temperature within a self-test module of the fire sensing device;

generating test media from a test medium in response to the change in temperature, wherein the test medium stimulates multiple gas reactions when exposed to the change in temperature;

detecting a number of gases corresponding to the test media within the fire sensing device in response to changing the temperature; and transmitting, by the controller, a result of the number of gases detected to be present within the fire sensing device to a remote computing device.

8. The method of claim 7, further comprising determining, by the remote computing device, whether the fire sensing device is in need of maintenance based on the result of the detection.

9. The method of claim 7, wherein changing the temperature within the self-test module includes:

increasing, by the controller, the temperature within the self-test module from a first temperature to a second temperature;

detecting the number of gases within the fire sensing device in response to increasing the temperature from the first temperature to the second temperature, wherein the number of gases includes at least two different gases; and transmitting, by the controller, a result of the number of gases detected to be present within the fire sensing device to the remote computing device.

10. The method of claim 9, wherein the test media are generated from the test medium such that a composition of the test medium allows for production of the number of gases responsive to changing the temperature.

11. The method of claim 9, wherein the number of gases include carbon monoxide, carbon dioxide, hydrogen, or nitrogen oxide.

12. The method of claim 9, wherein the test medium is included within the self-test module.

13. A system, comprising:

a computing device; and a fire sensing device including:

a multi-gas detector; and a controller configured to perform a self-test of the fire sensing device by:

increasing a sensitivity of the multi-gas detector;

detecting, via the multi-gas detector, a concentration of gases within the fire sensing device while the sensitivity of the multi-gas detector is increased; and transmitting the detected concentration of gases to the computing device;

wherein the computing device is configured to determine whether the self-test was successful based on the detected concentration of gases determined to be present within the fire sensing device and additional gases determined not to be present within the fire sensing device while the sensitivity of the multi-gas detector is increased.

14. The system of claim 13, wherein the concentration of gases include different types of gases.

15. The system of claim 13, wherein the controller is configured to perform the self-test by increasing the sensitivity of the multi-gas detector at periodic time intervals.

16. The system of claim 13, wherein the controller is configured to perform the self-test by:

increasing the sensitivity of the multi-gas detector above a threshold; and detecting, via the multi-gas detector, a concentration of gases within the fire sensing device while the sensitivity of the multi-gas detector is increased above the threshold.

17. The system of claim 13, wherein the computing device is configured to determine whether the self-test was successful by:

comparing the detected concentration of gases to a baseline measurement of the gases; and determining whether the detected concentration is different than the baseline measurement.

18. The system of claim 13, wherein the self-test of the fire sensing device is performed as a background test outside of a normal operation of the fire sensing device.

19. The system of claim 13, wherein the self-test of the fire sensing device is initiated automatically in response to the fire sensing device performing a background test.

20. The system of claim 13, wherein the self-test of the fire sensing device is initiated in response to the fire sensing device receiving a command from the computing device.

* * * * *